Aug. 19, 1924.
T. C. COOPER
1,505,700
MOUNTING FOR SPOTLIGHTS
Filed Oct. 28, 1922
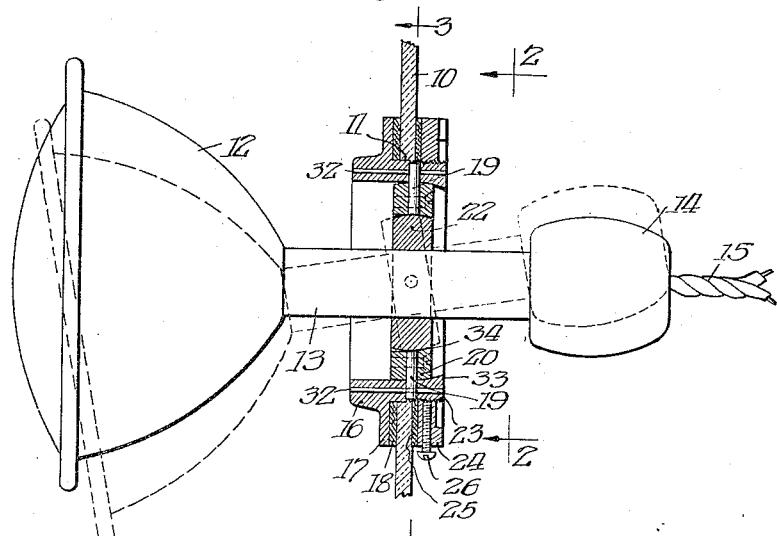
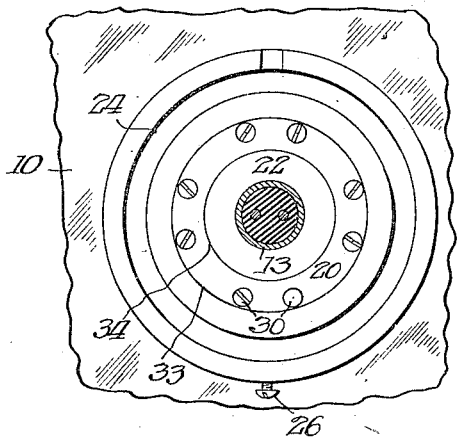
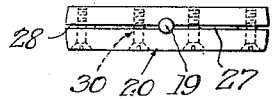
Inventor:
Thomas C. Cooper,
By Sheridan, Jones and Sheridan
attys.

Patented Aug. 19, 1924.

1,505,700

UNITED STATES PATENT OFFICE.

THOMAS C. COOPER, OF CHICAGO, ILLINOIS.

MOUNTING FOR SPOTLIGHTS.

Application filed October 28, 1922. Serial No. 597,466.

*To all whom it may concern:*

Be it known that I, THOMAS C. COOPER, a citizen of the United States, residing at Chicago, in the county of Cook and State of Illinois, have invented certain new and useful Improvements in Mountings for Spotlights, of which the following is a specification.

This invention relates to an improved mounting for automobile spot-lights.

The invention contemplates the mounting of the spot-light in an opening provided in the glass of the windshield so that the same will be readily accessible from within the vehicle for purposes of switching the light on and off and for making the desired adjustments, and with this in view, one object of the invention resides in the provision of means for securing the lamp in position in the windshield in such wise that the same will be capable of substantially universal movement for purposes of adjustment.

Another object is to provide a mounting of the class described which shall be simple in construction and operation and economical to manufacture.

Other objects will appear from the following specification taken in connection with the accompanying drawings wherein one form of the invention is illustrated.

In the drawings—

Figure 1 is a sectional view taken through a mounting constructed in accordance with the present invention, the mounting being shown in operative position in a windshield and the lamp being shown in operative position;

Figure 2 is an elevation taken on the line 2, 2 of Fig. 1;

Figure 3 is a sectional view taken on the line 3, 3 of Fig. 1; and

Figure 4 is a side elevation of the outer adjustable ring of the mounting.

Referring more in detail to the drawings, 10 designates the windshield of a motor vehicle having an opening or aperture 11 provided therein. 12 designates the spot-light or lamp which may be any of the well known types, said lamp, in the drawings, being shown as provided with a rearwardly extending elongated stem 13 terminating in an enlarged knoblike member 14 at its inner end. The electric cables are shown at 15 and extend through the knob 14, the stem 13, and make suitable connection with the lamp socket within the enlarged outer reflector portion of the spotlight. In practice, the switch for controlling the flow of electric current to the lamp is mounted within the knob portion 14 and is controlled by rotating said knob.

The mounting for the lamp, which forms the principal subject-matter of the present invention, comprises a cylindrical collar 16 of a size to fit snugly within the opening 11 in the glass of the windshield, the outer portion of said collar being provided with a laterally extending flange 17, which overlies the outer surface of the windshield immediately surrounding the opening 11 and when said collar 16 is in final position, the said flange bears against the outer surface of the glass, as shown. A cork gasket, or the like, 18 may, if desired, be interposed between the flange 16 and the glass. Pivoted within the collar 16 on suitable diametrically opposite pins 19 is an adjustable ring 20, and pivoted within the ring 20 on suitable pins 21 is a second adjustable ring 22. The pins 21 are also diametrically opposed and mounted on an axis at right angles to the pivotal axis of the outer ring 20. The stem 13 of the lamp engages through the opening of the inner ring 22, the engagement being a firm frictional one so that the possibility of accidental displacement is avoided.

As will be apparent from the foregoing, the two relatively movable rings 20 and 22 pivoted on axes at right angles one to the other, provide for substantially universal movement of the lamp 12 for purposes of adjustment. As will be obvious, either of said rings may be moved upon their pivots independently of the other to secure vertical or horizontal adjustments of the lamp, while in addition, both rings may be simultaneously adjusted to obtain angular adjustments of the lamp.

The inner end of the collar 16 is screw threaded as at 23 and designed for engagement by the screw threaded annulus 24, which maintains the entire assembly in operative position. A suitable gasket of cork, or the like, 25 may be interposed between the annulus 24 and the glass of the windshield and a set screw 26 may be provided for preventing the annulus "backing off" after the assembly has been installed.

It is preferred in practice to provide sufficient friction upon the pivot pins of the inner and outer relatively movable rings 20 and 22 of the mounting so that the lamp will remain in any of its adjusted positions without the aid of auxiliary retaining means, and with this in view, it is proposed to provide two pairs of diametrically opposite grooves or slits 27 and 28 in the outer ring 20. These grooves extend inwardly from the outer periphery of said ring to a point approximately coincident with the inner periphery thereof and in a plane parallel with the sides of said ring and preferably midway between said sides. The base of the grooves 27 and 28 preferably extend at right angles to the respective pivot pins 19 and 21 so that at the four points 29, the said ring 20 is solid from side to side, while throughout the remaining portions of the ring 20 the grooves 27 and 28 provide slight gaps between the side portions A plurality of screws 30, one on either side of the pivot pins 19 and 21, extend through the ring 20 where these gaps occur so that by properly adjusting said screws the amount of friction brought to bear upon the pivot pins may be regulated in such wise as to secure the right amount of friction for maintaining the lamp in any of its adjusted positions Rotation of the inner ring 22 upon the inner ends of the pivot pins 21 is prevented by means of cross pins 31, while rotation of the outer end of pivot pins 19 in the collar 16 is prevented by cross pins 32 Thus, by adjusting the screws 30 on either side of the pivot pins 19, frictional resistance to the movements of the outer ring 20 may be regulated, while a similar regulation for the inner ring 22 results from an adjustment of the screws 30 on either side of the pivot pins 21.

In order to minimize the possibility of leakage through the mounting, in the event of stormy weather or the like, the inner end 33 of the collar 16 is of arcuate design and overhangs outer ring 20, while said outer ring in turn is of similar design at 34 and overhangs slightly the inner ring 22.

It will be obvious to those skilled in the art that the present improvements may be used for many purposes other than for the mounting of spot-lights, and that the same are susceptible of many changes and modifications, and it is not therefore desired to limit or restrict the same to the particular form or arrangement of parts herein illustrated, except where limitations appear in the appended claims.

What I claim is—

1. A mounting for a motor vehicle spotlight comprising a collar, and inner and outer rings within said collar, diametrically opposite pivot pins fixed to said collar and engaging said outer ring, diametrically opposite pivot pins fixed to said inner ring and engaging said outer ring, said first pins extending at right angles to the second, grooves in said outer ring extending from its outer periphery inwardly in the vicinity of each of said pins, and means associated with the walls of said grooves for regulating the frictional engagement between said pins and said outer ring.

2. A mounting for a motor vehicle spotlight comprising a collar, and inner and outer rings within said collar, diametrically opposite pivot pins carried by said collar and said outer ring, diametrically opposite pivot pins carried by said inner ring and said outer ring, said first pins extending substantially at right angles to the second, one of said pin carrying parts comprising parallel members embracing opposite sides of a pin with means for varying the frictional engagement thereof.

In testimony whereof, I have subscribed my name.

THOMAS C. COOPER.